(12) United States Patent
Sakai

(10) Patent No.: US 7,162,331 B2
(45) Date of Patent: Jan. 9, 2007

(54) POWER SUPPLY CONTROL DEVICE AND METHOD FOR MOBILE ROBOT

(75) Inventor: Katsushi Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 87 days.

(21) Appl. No.: 10/624,594

(22) Filed: Jul. 23, 2003

(65) Prior Publication Data

US 2004/0017181 A1    Jan. 29, 2004

(30) Foreign Application Priority Data

Jul. 24, 2002    (JP) ............................. 2002-214737

(51) Int. Cl.
    *G06F 19/00*    (2006.01)
(52) U.S. Cl. .................. 700/245; 700/246; 700/247; 700/248; 700/249; 700/250; 700/251; 700/256; 318/568.1; 318/568.11; 318/568.12; 318/568.16; 318/568.17; 318/568.2; 701/23; 701/24; 701/25; 701/26; 701/300; 701/301; 901/1; 901/9; 901/46; 901/47
(58) Field of Classification Search ........ 700/245–251, 700/256–264; 15/319; 318/568.1, 568.11, 318/568.12, 568.16, 568.17, 568.2; 701/23–26, 701/300–301; 901/1, 9, 46–47
See application file for complete search history.

(56) References Cited

U.S. PATENT DOCUMENTS

| | | | | |
|---|---|---|---|---|
| 5,045,769 A * | 9/1991 | Everett, Jr. ................ 320/107 |
| 5,220,263 A * | 6/1993 | Onishi et al. ................ 318/587 |
| 5,534,762 A * | 7/1996 | Kim ....................... 318/568.12 |
| 5,576,605 A * | 11/1996 | Miyazawa .............. 318/568.12 |
| 5,646,494 A * | 7/1997 | Han ............................ 318/587 |
| 5,787,545 A * | 8/1998 | Colens ......................... 15/319 |
| 5,869,910 A * | 2/1999 | Colens ........................ 307/104 |
| 6,266,576 B1 * | 7/2001 | Okada et al. ................ 700/245 |
| 6,415,203 B1 | 7/2002 | Inoue et al. |
| 6,480,761 B1 * | 11/2002 | Ueno et al. .................. 700/245 |
| 6,538,410 B1 * | 3/2003 | Mori et al. ............ 318/568.12 |
| 6,748,297 B1 * | 6/2004 | Song et al. .................. 700/259 |
| 6,841,963 B1 * | 1/2005 | Song et al. ............ 318/568.12 |
| 2003/0028993 A1 * | 2/2003 | Song et al. .................... 15/319 |

FOREIGN PATENT DOCUMENTS

JP    2001-328091    11/2001
WO    WO 0067960    11/2000

OTHER PUBLICATIONS

Office Action from Japan Patent Office mailed Jul. 25, 2006.

* cited by examiner

*Primary Examiner*—Thomas G. Black
*Assistant Examiner*—McDieunel Marc
(74) *Attorney, Agent, or Firm*—Staas & Halsey LLP

(57) ABSTRACT

A charging/discharging circuit electrically controls the charge of a battery using supplied current and discharge of it. A micro-controller drives a robot according to instructions from a personal computer, controls the charging/discharging circuit while monitoring the battery state, and during the charge, prohibits the operation of a travel mechanism.

13 Claims, 7 Drawing Sheets

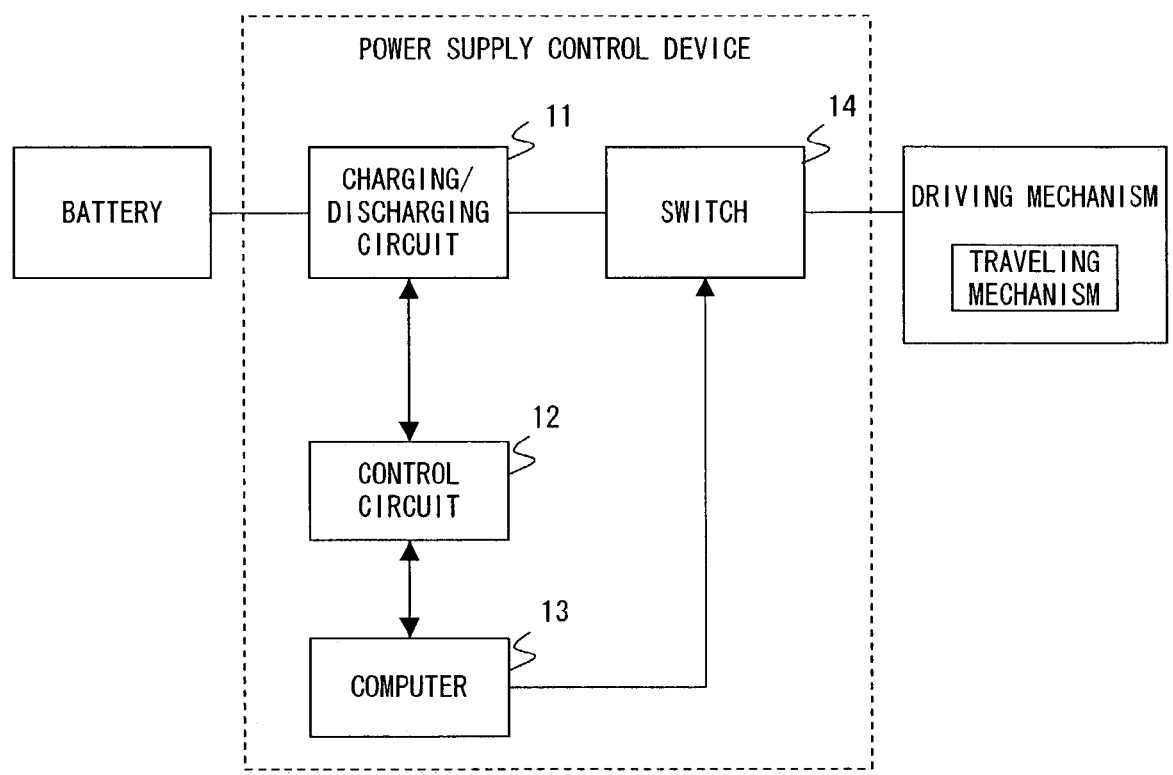
F I G. 1

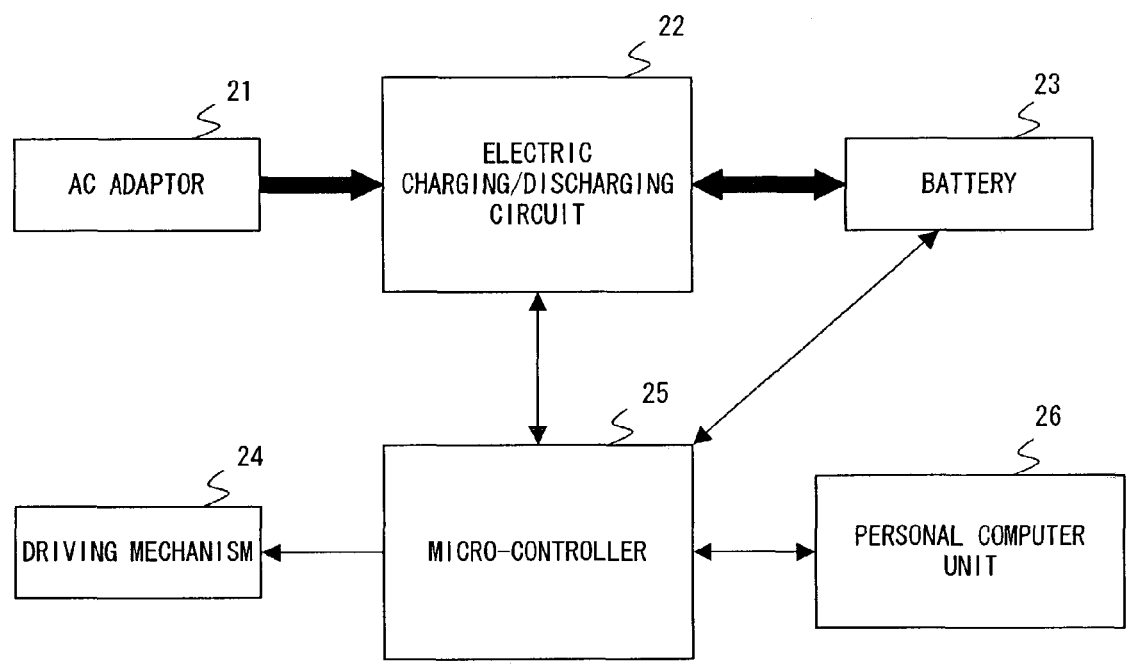
F I G. 2

| | Main Switch OFF | | Main Switch ON | |
|---|---|---|---|---|
| | AC Adaptor OFF | AC Adaptor ON | AC Adaptor OFF | AC Adaptor ON |
| Software Switch OFF | Charge: Impossible<br>Discharge: 0 (only self-discharge of battery)<br>Motor operation: Impossible | | Charge: Impossible<br>Discharge: CPU idle power (several milli-amperes)<br>Motor operation: Impossible | Charge: Possible<br>Discharge: CPU idle power (several milli-amperes)<br>Motor operation: Impossible |
| Software Switch ON | Charge: Impossible<br>Discharge: 0 (only self-discharge of battery)<br>Motor operation: Impossible | | Charge: Impossible (remaining power check required)<br>Discharge: Logic and motor (battery)<br>Motor operation: Possible | Charge: Possible (over-discharge check required)<br>Discharge: Logic (AC) and motor (battery)<br>Motor operation: Only pan/tilt possible |

F I G. 4

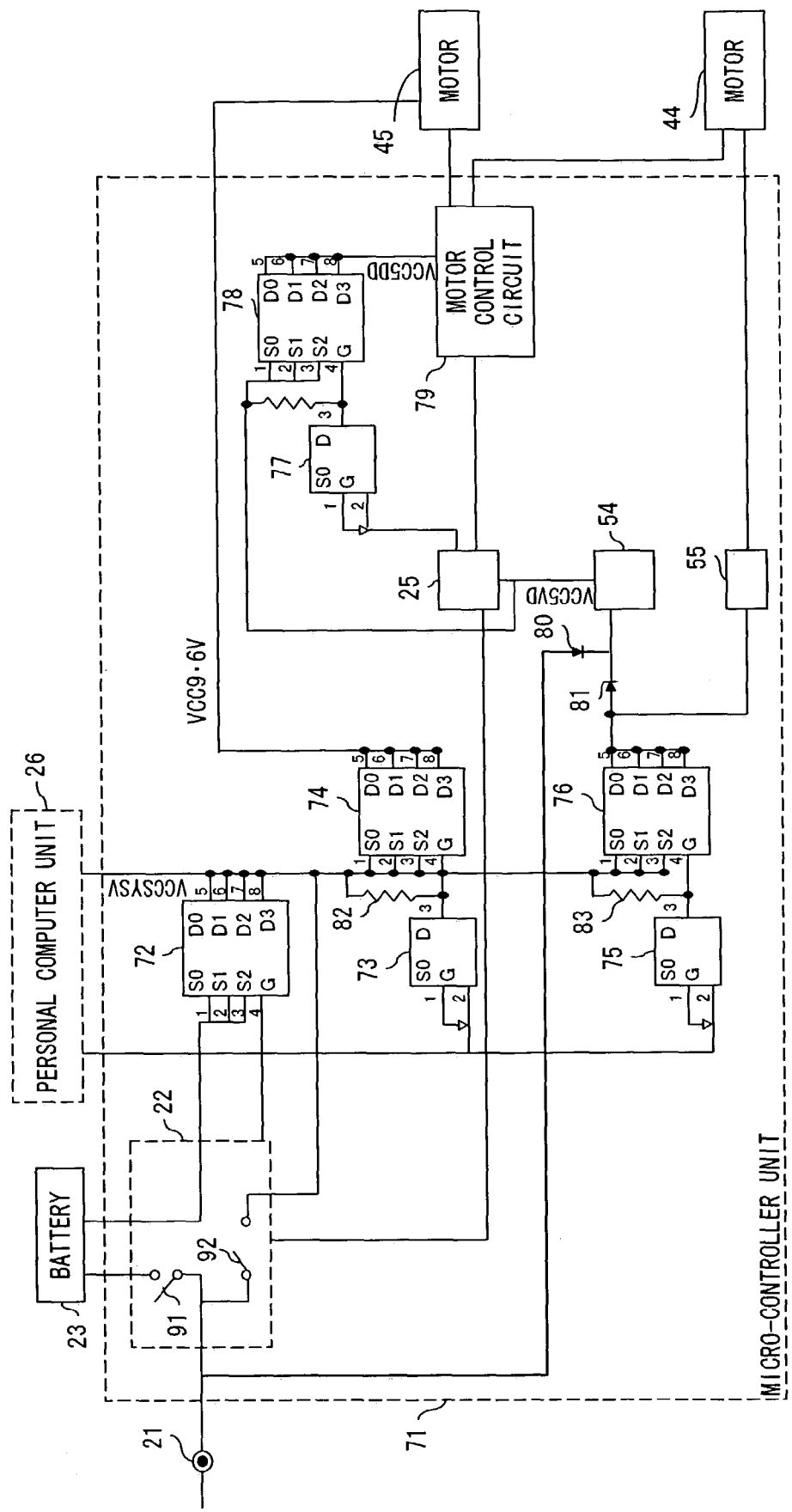
F I G. 5

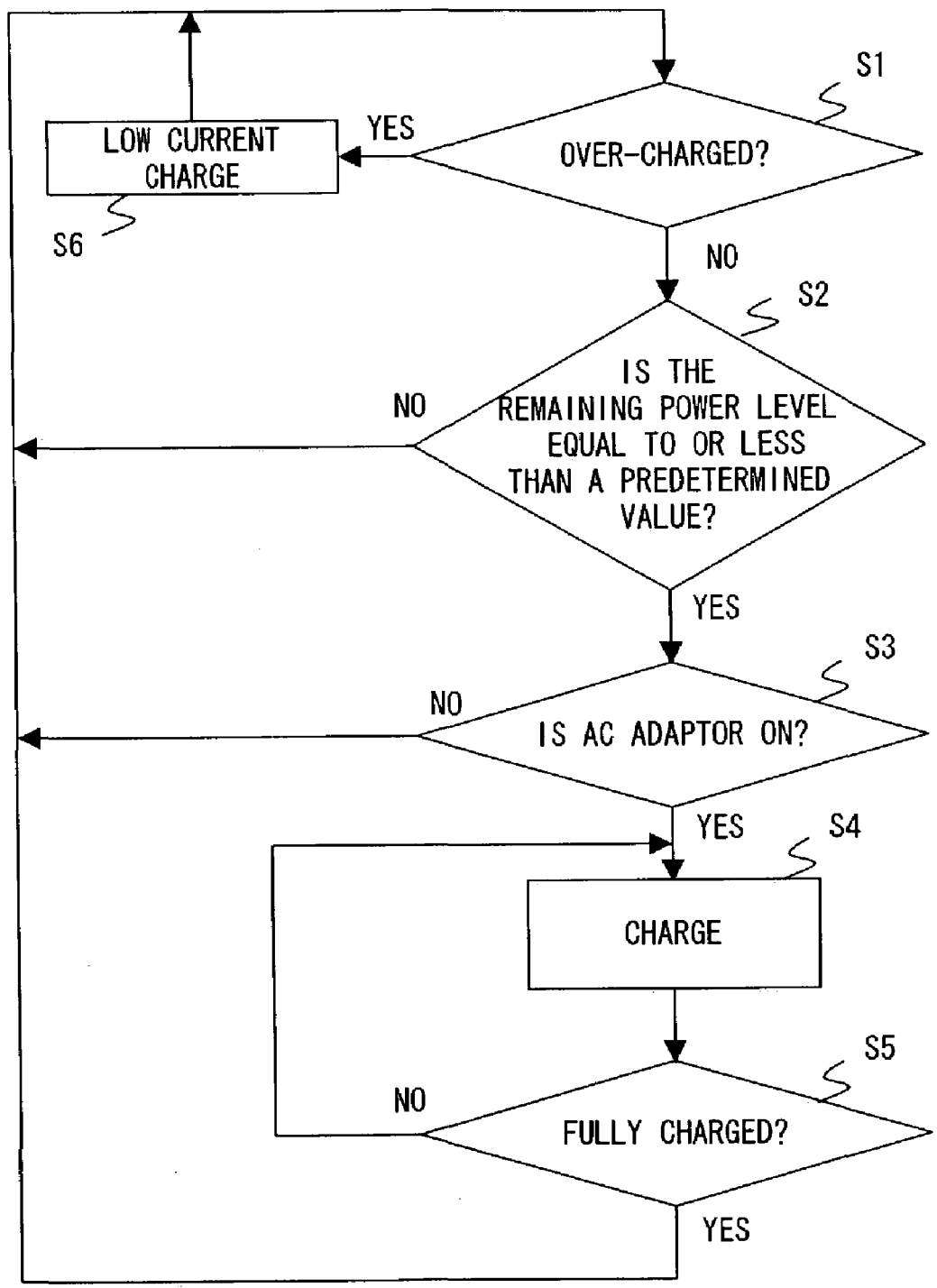
F I G. 6

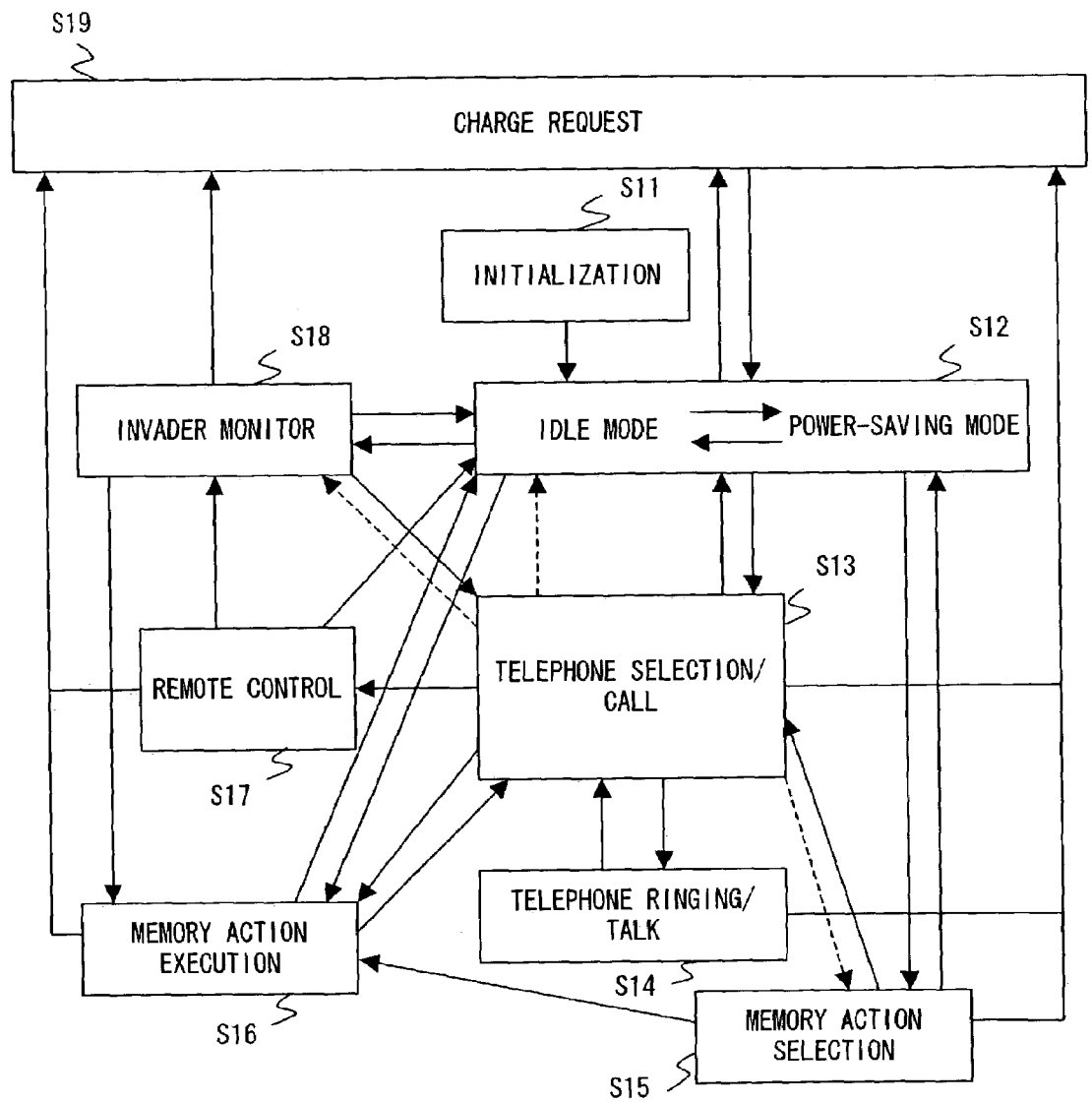
F I G. 7

POWER SUPPLY CONTROL DEVICE AND METHOD FOR MOBILE ROBOT

BACKGROUND OF THE INVENTION

1. Field of the Invention

The present invention relates to a device for controlling the power supply of a mobile robot with a charging mechanism and a method thereof.

2. Description of the Related Art

Recently, with the advance of robot technology, a variety of robots, such as industrial robots, pet robots and robots for home use, have been proposed. Most of these robots are provided with a travel mechanism, such as wheels, crawlers, feet or the like, and are called "mobile robots". Although a conventional mobile robot comprises a drive mechanism requiring a large amount of electric current and a logic unit requiring a small amount of electric current, the charging mechanisms for these two units are not clearly separated from each other and optimal power supply control can not always be performed.

SUMMARY OF THE INVENTION

It is an object of the present invention to provide a device for efficiently controlling the power supply of a mobile robot and a method thereof.

The first power supply control device of the present invention is used for a mobile robot system with a travel mechanism and a battery. This power supply control device comprises a charging/discharging circuit, a control circuit and a computer.

The charging/discharging circuit electrically controls the charge and discharge of the battery. The control circuit checks the remaining power in the battery. If it determines that the remaining power is insufficient, it prohibits the operation of the travel mechanism and issues an alarm indicating an insufficient remaining power. Simultaneously, the control circuit instructs the charging/discharging circuit to charge the battery. If it determines that the remaining power is sufficient, it permits the operation of the travel mechanism. The computer executes a program controlling a series of robot system operations, and on receipt of the alarm from the control circuit, it issues a charge request message to a user.

The second power supply control device of the present invention is used for a mobile robot system with a drive mechanism and a battery. This power supply control device comprises a charging/discharging circuit and a control circuit.

The charging/discharging circuit comprises a current path branching current from the power supply adaptor to the battery and to the drive mechanism. The charging/discharging circuit supplies current for the drive mechanism from the power supply adaptor while charging the battery with current supplied from the power supply adaptor. The control circuit instructs the charging/discharging circuit to charge the battery and simultaneously it permits the operation of the drive mechanism during the charge.

The third power supply control device of the present invention is used for a mobile robot system with a battery and a control logic unit. This power supply control device comprises a charging/discharging circuit and a control circuit.

The charging/discharging circuit comprises a current path branching current from the power supply adaptor to the battery and to the drive mechanism. When the logic unit is not operating, the charging/discharging circuit charges the battery with current supplied from the power supply adaptor. When the logic unit is operating, it supplies current for the logic unit from the power supply adaptor while charging the battery with current supplied from the power supply adaptor. The control circuit instructs the charging/discharging circuit to charge the battery.

The fourth power supply control device of the present invention is used for a mobile robot system with a drive mechanism and a battery. The power supply control device comprises a computer and a switch.

The computer executes a program controlling a series of robot system operations. The switch detects whether the computer is driven. If the computer is not driven, the switch automatically cuts off the power supply to the drive mechanism from the battery.

BRIEF DESCRIPTION OF THE DRAWINGS

FIG. 1 shows the basic configuration of the power supply control device of the present invention;

FIG. 2 shows the basic configuration of the robot system;

FIG. 4 shows the relationship between charge and discharge;

FIG. 5 shows the configuration of a micro-controller unit;

FIG. 6 is a flowchart showing the charge control process; and

FIG. 7 is a flowchart showing the control process by an application program.

DESCRIPTION OF THE PREFERRED EMBODIMENTS

Figure 3:
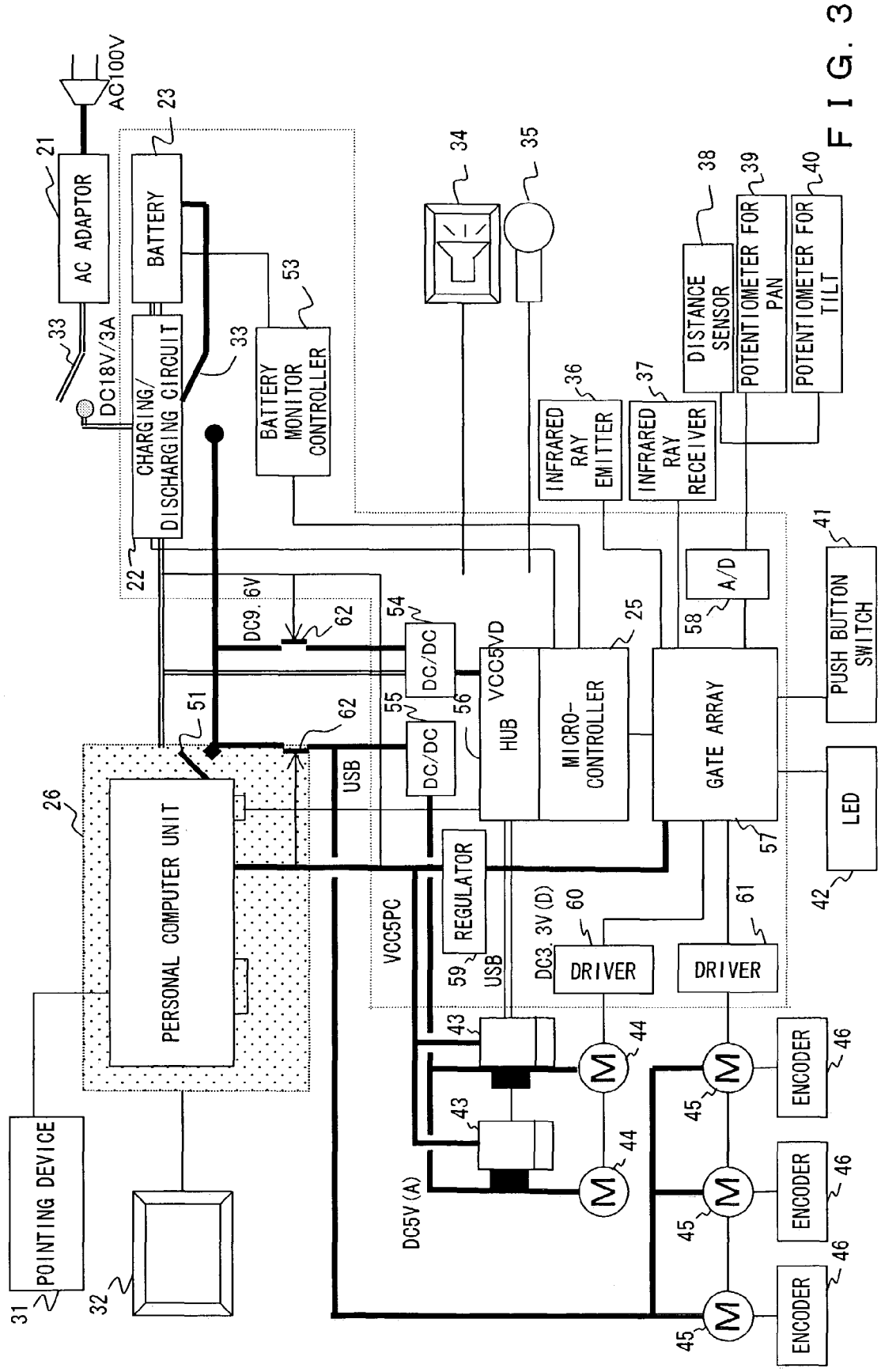
FIG. 3 shows the detailed configuration of the robot system.

The preferred embodiments of the present invention are described in detail below with reference to the drawings.

FIG. 1 shows the basic configuration of the power supply control device of the present invention.

The first power supply control device of the present invention is used for a mobile robot system with a travel mechanism and a battery. This power supply control device comprises a charging/discharging circuit 11, a control circuit 12 and a computer 13.

The charging/discharging circuit 11 electrically controls the charge and discharge of the battery. The control circuit 12 checks the remaining power in the battery. If it determines that the remaining power is insufficient, it prohibits the operation of the travel mechanism 15 and issues an alarm indicating an insufficient remaining power, and simultaneously instructs the charging/discharging circuit 11 to charge the battery. If it determines that the remaining power is sufficient, it permits the operation of the travel mechanism. The computer 13 executes a program controlling a series of robot system operations, and on receipt of the alarm from the control circuit 12, it issues a charge request message to a user.

The charging/discharging circuit 11 comprises a charging path and a discharging path. If the remaining power in the battery is insufficient, the control circuit 12 prohibits the operation of the travel mechanism. If the remaining power is sufficient, it permits the operation of the travel mechanism. Since it is the travel mechanism that consumes the most power in the mobile robot system, by prohibiting its operation, the draining of the remaining power in the battery can be delayed and accordingly the remaining power can be effectively used.

If the remaining power in the battery is insufficient, the control circuit 12 issues an alarm to the computer 13. Then, the computer 13 issues a charge request message. On receipt of the message, a user, for example, inserts the plug of the power supply adaptor in the AC (alternate current) main. Once the charging preparation is completed, the charging/discharging unit 11 starts charging the battery according to instructions from the control circuit 12. In this way, by controlling the system using both the control circuit 12 and the computer 13 together, power supply can be optimized.

The second power supply control device of the present invention is used for a mobile robot system with a drive mechanism and a battery. This power supply control device comprises a charging/discharging circuit 11 and a control circuit 12.

The charging/discharging circuit 11 comprises a current path branching current from the power supply adaptor to the battery and to the drive mechanism. The charging/discharging circuit 11 supplies current to the drive mechanism from the power supply adaptor while charging the battery with current supplied from the power supply adaptor. The control circuit 12 instructs the charging/discharging circuit 11 to charge the battery, and simultaneously it permits the operation of the drive mechanism during the charge.

The drive mechanism includes not only a travel mechanism, but also a mechanism for driving the movable units of the robot system, such as the joints of the arms, a manipulator and a camera. By providing a current path that also supplies current for the drive mechanism during charging of the battery with current from the power supply adaptor, a part of the drive mechanism can be operated at a constant voltage even during the charge.

The third power supply control device of the present invention is used for a mobile robot system with a battery and a control logic unit. This power supply control device comprises a charging/discharging circuit 11 and a control circuit 12.

The charging/discharging circuit 11 comprises a current path branching current from the power supply adaptor to the battery and to the drive mechanism. When the logic unit is not operating, the charging/discharging circuit charges the battery with current supplied from the power supply adaptor. When the logic unit is operating, it supplies current to the logic unit from the power supply adaptor while charging the battery with current supplied from the power supply adaptor. The control circuit 12 instructs the charging/discharging circuit 11 to charge the battery.

The logic unit corresponds to a mechanism for controlling the operation of the robot system. For example, the logic unit includes a control unit 12, a computer 13 and other logic circuits. By providing a current path that can also supply current to the logic unit during charging of the battery with the power supply adaptor, the logic unit can be operated while securing charging current. However, when the logic unit is not operating, the current to be consumed can be used for charging. Therefore, the maximum charging current can be secured.

The fourth power supply control device of the present invention is used for a mobile robot system with a drive mechanism and a battery. The power supply control device comprises a computer 13 and a switch 14.

The computer 13 executes a program controlling a series of robot system operations. The switch 14 detects whether the computer 13 is driven. If the computer 13 is not driven, the switch 14 automatically cut off the power supply to the drive mechanism from the battery.

The switch 14 is provided between the battery and the drive mechanism, and turns on/off the power supply to the drive mechanism from the battery. In this case, the switch 14 detects whether the computer 13 is driven, and if it detects that the computer 13 is not driven, cuts off the power supply. Usually, there is no need to operate the drive mechanism if the computer 13 is not driven. Therefore, by separating the battery from the drive mechanism, the waste of discharge can be prevented.

The charging/discharging circuit 11, control circuit 12 and computer 13, which are shown in FIG. 1, correspond to the electric charging/discharging circuit 22, micro-controller 25 and personal computer unit 26, respectively, which are shown in FIG. 2. The switch 14 shown in FIG. 1 corresponds to the switch 62, which is shown in FIG. 3.

FIG. 2 shows the basic configuration of the robot system of the present invention. The robot system shown in FIG. 2 is, for example, a mobile robot with a charging mechanism. The robot system comprises an AC (alternate current) adaptor 21, an electric charging/discharging circuit 22, a battery 23, a drive mechanism 24, a micro-controller 25 and a personal computer unit 26.

The charging/discharging circuit 22 electrically controls the charge and discharge of the battery 23 using current supplied from the AC adaptor 21. The personal computer unit 26 executes an application program controlling a series of robot operations. The micro-controller 25 drives the drive mechanism 24 according to instructions from the personal computer unit 26, and simultaneously controls the charging/discharging circuit 22 while monitoring the state of the battery.

By adopting three concepts; electrical control by the charging/discharging circuit 22, local power supply control by the micro-controller 25 and global power supply control by the micro-controller 25 and the personal computer unit 26, the power supply control of a robot system can be optimized.

In this system, the micro-controller 25 controlling the driving of the robot controls the charge of the battery 23. The micro-controller 25 can detect the state of the battery 23, and if the remaining power level in the battery 23 drops below a predetermined value, it automatically starts charging the battery again. If the micro-controller 25 determines that the remaining power in the battery 23 is insufficient on receipt of a drive command from the personal computer unit 26, it stops the discharge for driving and issues an alarm to the personal computer unit 26. Although there is basically no need for the personal computer unit 26 to control the charge, it can instruct a user to turn on/off the charge depending on the state of the application program.

In this way, by combining passive charging control by the micro-controller 25 with active charging control by the personal computer unit 26, the power supply control of a mobile robot system can be optimized.

FIG. 3 shows the detailed configuration of the robot system shown in FIG. 2. The motherboard of the personal computer unit 26 further comprises a CPU (central processing unit), a ROM (read-only memory), a RAM (random-access memory) and a software switch 51. A pointing device 31 and a microphone 35 are used for a user to input instructions and information. A display device 32 and a speaker 34 are used to output inquiries and information to the user.

The charging/discharging circuit 22 is connected to an AC adaptor 21 through a main switch 33. A battery monitor controller 53 detects the charging/discharging state of the battery 23 and notifies the micro-controller 25 of the state. For the battery 23, a nickel-hydrogen battery or the like is used.

A DC/DC converter (direct current converter) 54 is directly connected to the charging/discharging circuit 22, and is also connected to the battery 23 through a main switch 33 and a switch 62. The DC/DC converter 54 converts the power supply voltage supplied from the battery 23 or the charging/discharging circuit 22 into 5V for the logic circuit and supplies it to a HUB 56. The HUB 56 is connected to each of the micro-controller 25, the personal computer unit 26 and CMOS (complementary metal-oxide semiconductor) cameras 43.

The DC/DC converter 55 is connected to the battery 23 through the main switch 33 and the switch 62. The DC/DC converter 55 converts the power supply voltage supplied from the battery 23 to 5V and supplies it to motors for pan/tilt 44. The cameras 43 are driven by the motors 44 and perform pan/tilt operations. The power (5V) for the cameras 43 is supplied from the personal computer unit 26. A regulator 59 converts the power supply voltage to 3.3V and supplies it to a gate array 57.

The gate array 57 is a FPGA (field programmable gate array). An infrared ray emitter 36, an infrared ray receiver 37, an A/D (analog-to-digital) converter 58, a push button 41 and an LED (light-emitting diode) 42 and drivers 60 and 61 are connected to this gate array 57.

The LED 42 functions as an indicator indicating a charging state, and if the charging is completed, it goes off. A distance sensor 38, a potentiometer for pan 39 and a potentiometer for tilt 40 are connected to the A/D converter 58.

The motors 45 drive the travel mechanism (left and right wheels and a crawler) of the robot system. The drivers 60 and 61 control motors 44 and 45, respectively. An encoder 46 detects the rotation of the motor 45. The motors 44 and 45 correspond to the drive mechanism 24 shown in FIG. 2.

The main switch 33 is, for example, provided on the surface of the body of the robot system and is operated by a user. The software switch 51 is a switching circuit, which is turned on/off by the personal computer unit 26.

The switch 62 is a switching circuit that electrically detects the drive/non-drive signals of the personal computer unit 26 and operates accordingly. If the software switch 51 is turned on, it is turned on. If the software switch 51 is turned off, it is turned off. By providing such a switch 62, power supply to the drive circuits (motors 44 and 45) from the battery 23 can be automatically cut off without the intervention of the micro-controller 25 if the personal computer unit 26 is not driven.

In the case of a mobile robot system, it is preferable not to discharge the battery 23 when the personal computer unit 26 is not driven. In such a case, by completely cutting off the leaking current of the drive system by the switch 62, the life of the battery 23 can be prolonged.

FIG. 4 shows the relationship between the charging and discharging of the battery 23 that is controlled by the main switch 33 and the switch 51. If the main switch 33 is turned off, the charging/discharging circuit 22 is disconnected from the AC adaptor 21, and the battery 23 is also disconnected from the path (DC9.6V) to the drive circuits. Therefore, neither charge nor motor operation is possible, and only the self-discharge of the battery 23 is conducted.

If the main switch 33 is turned on, the charging/discharging circuit 22 is connected to the AC adaptor 21 and the battery 23 is connected to the drive circuits. This includes the following four cases, depending on whether or not AC100V is supplied to the AC adaptor 21 (the AC adaptor is turned on or off) and whether the software switch 51 is turned on or off. The turning-on/off of the AC adaptor 21 means whether or not the plug of the AC adaptor 21 is inserted in the AC main.

(1) In the Case where the AC Adaptor and the Software Switch are Both Turned Off Since the AC adaptor 21 is turned off, charge is impossible. Since the software switch 51 is turned off, the switch 62 is also turned off and the battery 23 is separated from the motors 44 and 45. Therefore, the motors 44 and 45 cannot operate. However, since the battery 23 supplies power to the personal computer unit 26 through the charging/discharging circuit 22, CPU idle power (approximately several milliamperes) is discharged.

(2) In the Case where the AC Adaptor and the Software Switch are Turned Off and On, Respectively Charge is impossible. However, since the software switch 51 is turned on, the switch 62 is also turned on, and the battery 23 is connected to the DC/DC converter 55 and the motors 45. Therefore, the motors 45 can operate. Since the battery 23 is also connected to the DC/DC converters 54, the logic unit and the motors 44 and 45 are discharged.

The logic unit is the generic name for all the logic circuits of the personal computer unit 26 and the micro-controller unit that are shown in FIG. 5. This logic unit includes the DC/DC converters 54 and 55, the micro-controller 25, the gate array 57, the A/D converter 58 and the drivers 60 and 61.

In this case, the micro-controller 25 checks the remaining power in the battery 23. If the remaining power in the battery 23 is sufficient, it permits the operation of the motors. If the remaining power in the battery 23 is insufficient, it prohibits the operation of the motors and also issues an alarm to the personal computer unit 26.

(3) In the Case where the AC Adapter and the Software Switch are Turned On and Off, Respectively Since the AC adaptor 21 is turned on, charge is possible. However, since the battery 23 is separated from the motors 44 and 45, the motors 44 and 45 cannot operate. In the personal computer unit 26, CPU idle power is discharged.

(4) In the Case where the AC Adaptor and the Software Switch are Both Turned On

Both charging and motor operation are possible. However, the plug of the AC adaptor 21 is inserted in the AC main. Therefore, if the robot system travels, there is a possibility that charge may be disturbed. The drive of the travel mechanism requires a large amount of current. Therefore, it is not preferable to operate the travel mechanism during the charge. Accordingly, during the charge, the micro-controller prohibits the operation of the motors 45 to prevent the travel mechanism from being driven.

In this case, if the cameras 43 are unable to be driven, it is undesirable. Therefore, the operation of the motors 44 is permitted. Therefore, the cameras 43 can perform pan/tilt operations. In this case, by directly supplying power from the AC adaptor 21 that has power to spare, the constant voltage (5V) drive of the motors 44 becomes possible.

When the charge is completed, the user turns the AC adaptor 21 off prompted by instructions from the personal computer unit 26, and the micro-controller 25 permits the operation of the motors 45. In this way, the charge is stopped, and both the cameras 43 and the travel mechanism can be made operable by power from the battery 23.

By dynamically changing the drive of the travel mechanism depending on a charging state, the risk of voltage fluctuations that directly affects the drive circuits can be avoided while the remaining power in the battery 23 is being secured.

If in the state where the battery 23 is performing constant current charge, the software switch 51 is turned on and the personal computer unit 26 is driven, not the battery 23 but the AC adaptor 21 supplies power to the personal computer unit 26. Such power supply control can be made possible by designing the system in such a way that the rated current of the AC adaptor 21 may become the sum of the charging current and the consumption current of the logic unit and by branching the current path from the AC adaptor 21 into that to the logic unit and that to the battery 23.

For example, when the charging current and the consumption current of the logic unit are both 1.5 A, such power supply control is possible if the rated current of the AC adaptor 21 is set to 3 A. In this case, the charging/discharging circuit 22 performs the following charge/discharge control.

If the logic unit temporarily requires current exceeding 1.5 A, the amount of charging current is reduced and the reduced amount of current is allocated to the logic unit. If the allocated current is still insufficient, the current shortage is made up for by the battery 23 supplying current while charging. If the logic unit is turned off, charge can be conducted with a 3 A current. After the charge has been completed, the AC adaptor 21 supplies a maximum of 1.5 A to the logic unit. If a current exceeding 1.5 A is required to drive the motors 45, the battery 23 makes up for the current shortage.

By branching a current path from the AC adaptor 21 into that to the logic unit and that to the battery 23, maximum charging performance can be achieved regardless of the turning-on/off of the logic unit.

As described above, by functionally breaking down the charge/discharge of the battery 23, the full charging/discharging performance of the battery 23, being a limited resource, can be effectively achieved.

Next, the configuration and operation of the robot system shown in FIG. 3 are described in detail with reference to FIGS. 5 through 7.

FIG. 5 shows the configuration of the micro-controller unit. FIG. 5 assumes the case where the main switch 33 shown in FIG. 3 is turned on. The micro-controller unit 71 comprises a charging/discharging circuit 22, FETs (field-effect transistors) 72 through 78, a micro-controller 25, DC/DC converters 54 and 55, a motor control circuit 79, diodes 80 and 81 and resistors 82 and 83.

The portion, excluding the charging/discharging circuit 22, of the micro-controller unit 71 is a logic unit, and this unit operates on a voltage of 5V or less. The FETs 73 through 76 correspond to the switch 62 shown in FIG. 3. The motor control circuit 79 corresponds to the drivers 60 and 61 shown in FIG. 3.

The FETs 73, 75 and 77 are N-channel MOSFETs. If a signal of logic "1" is inputted to gate G, the FETs 73, 75 and 77 are turned on and connect source S0 to drain D. The FETs 72, 74, 76 and 78 are P-channel MOSFETs. If a signal of logic "0" is inputted to gate G, they are turned on and connect sources S0, S1 and S2 to drains D0, D1, D2 and D3. Therefore, if a signal of logic "1" is inputted into the gates G of the FETs 73, 75 and 77, the inputs of the FETs 74, 76 and 78 are connected to respective outputs.

The charging/discharging circuit 22 includes switches 91 and 92, and the micro-controller 25 controls them. For these switches, FETs or the like are used. The switch 91 is turned on when the battery 23 starts being charged, and is turned off when the charge is completed. The switch 92 is turned on when the AC adaptor 21 is turned on, and is turned off when the AC adaptor is turned off. During the charge, in the charging/discharging circuit 22, the current path from the AC adaptor 21 branches into two current paths; a path to the battery 23 and a path to the logic unit (VCCSYSV).

The FET 72 is a switch used to connect current from the battery 23 to VCCSYSV, and is usually turned on. The charging/discharging circuit 22 turns the FET 72 off when the battery 23 is over-discharged.

If the personal computer unit 26 is driven, the personal computer unit 26 outputs an on-signal of logic "1" to FETs 73 and 75, and FET 74 and 76 are turned on. In this way, the VCCSYSV is connected to each of the power supply line (VCC9.6V) of the motor 45 and the inputs of the DC/DC converters 54 and 55. The DC/DC converter 54 generates a constant voltage of 5V (VCC5VD) and supplies it to the logic circuits in the micro-controller unit 71. The DC/DC converter 55 supplies a constant voltage of 5V to the motor 44.

If the personal computer unit 26 is not driven, the FETs 74 and 76 are tuned off, and the VCCSYSV is cut off from both the motor 45 and the DC/DC converters 54 and 55.

By controlling an FET 77, the micro-controller 25 can supply constant voltage generated by the DC/DC converter 54 to a motor control circuit 79 or can stop the power supply to the motor control circuit 79. The motor control circuit 79 operates with the supplied voltage (VCC5DD), and controls the respective drive of the motors 44 and 45 according to instructions from the micro-controller 25.

FIG. 6 is a flowchart showing the charge control process performed by the micro-controller 25. This process is autonomously performed without instructions from the personal computer unit 26.

Firstly, the micro-controller 25 checks whether the battery 23 is over-discharged, which is notified by a battery monitor controller 53 (step S1). If the battery 23 is over-discharged, it instructs the charging/discharging circuit 22 to conduct low current charge (step S6), and repeats the check in step S1.

If the battery 23 is not over-discharged, then the micro-controller 25 checks whether the remaining power level of the battery 23, which is notified by the battery monitor controller 53, is equal to or less than a predetermined value (for example, 70% or less) (step S2). If the remaining power level exceeds the predetermined value, there is no need to charge. Therefore, the processes in and after step S1 are repeated.

If the remaining power level is equal to or less than the predetermined value, the micro-controller 25 prohibits the respective drive of the motors 44 and 45, issues an alarm to the personal computer unit 26 and checks whether the AC adaptor 21 is tuned off (step S3). If the AC adaptor 21 is turned off, the processes in and after step S1 are repeated.

If the AC adaptor 21 is turned on, the micro-controller 25 instructs the charging/discharging circuit 22 to charge (step S4) and checks whether the battery 23 is fully-charged, which is notified by the battery monitor controller 53 (step S5). If the battery 23 is not fully charged, the processes in and after step S4 are repeated. If the battery 23 is fully charged, the processes in and after step S1 are repeated.

As described above, if the remaining power in the battery 23 is insufficient, by prohibiting the respective drive of the motors 44 and 45, the discharge of the battery 23 can be limited only to the logic unit. By issuing an alarm to the personal computer unit 26, the personal computer unit 26 can issue a charge request to a user.

FIG. 7 is a flowchart showing the operation control process of the robot system, which is performed by the application program of the personal computer unit 26. This application program corresponds to a program by which a user remotely controls and executes invader monitoring or other simple tasks using a cellular phone when he/she is away.

The personal computer unit 26 starts when the software switch 51 is turned on. After performing an initialization process (step S11), the personal computer unit 26 enters an idle mode (step S12). In the idle mode, the personal computer unit 26 monitors incoming calls to a telephone set built into the robot system and a memory action trigger.

The personal computer unit 26 can talk on a handsfree telephone by using the speaker 34 and microphone 35 that are shown in FIG. 3. Monitoring by telephone means to monitor an incoming call from a user, to check the phone number of a caller and to accept the call if the phone number is permitted to connect.

A memory action corresponds to a series of predetermined robot system operations. An example of such an operation is to go to the door, to take a photograph of its keyhole and to transmit the taken photographic image to a user over a cellular phone. A memory action trigger corresponds to an event that triggers a specific memory action.

The personal computer unit 26 shifts from idle mode to a power-saving mode when the user leaves his/her house and the robot system starts to look after the house. When the robot system terminates to look after the house, the personal computer unit 26 returns to idle mode. In the power-saving mode, neither telephone can be used nor a memory action can be selected.

If there is an incoming call or a telephone call is originated, the personal computer unit 26 performs a telephone selection/call process (step S13), and displays a telephone screen on a user's cellular phone. In this process, telephone monitoring and memory action trigger monitoring are conducted. When the telephone screen is terminated or the incoming call is disconnected, the personal computer unit 26 returns to idle mode. If the telephone call is received or the telephone call has been originated, the personal computer unit 26 performs a telephone ringing/talk process (step S14). When the telephone ringing/talk is terminated, the personal computer unit 26 performs the telephone selection/call process again.

In idle mode, if the personal computer unit 26 receives a memory action selection instruction from the user, the personal computer unit 26 performs a memory action selection process (step S15). In this process, the personal computer unit 26 displays a memory action selection screen on the user's cellular phone and conducts the telephone monitoring and memory action trigger monitoring. When the user terminates the memory action selection, the personal computer unit 26 returns to idle mode.

In the memory action selection process, if there is an incoming call or if an emergency call must be originated, the personal computer unit 26 performs a telephone selection/call process. When the incoming call is disconnected, the personal computer unit 26 performs the memory action selection process again.

In idle mode, if invader monitoring is started, the personal computer unit 26 performs an invader monitoring process (step S18). In this process, the personal computer unit 26 monitors whether there is an invader, using the cameras 43 shown in FIG. 3, and performs telephone monitoring and memory action trigger monitoring. When the invader monitor is terminated, the personal computer unit 26 returns to idle mode.

During the invader monitoring process, if there is an incoming call, an emergency call must be originated or an invader has been detected, the personal computer unit 26 performs the telephone selection/call process. When the incoming connection is disconnected, the personal computer unit 26 resumes the invader monitoring process.

In the telephone selection/call process, if a remote control trigger is generated according to an instruction from a user, the personal computer unit 26 performs a remote control process (step S17). When the remote control is terminated, the personal computer unit 26 returns to idle mode. If invader monitoring is conducted, the personal computer unit 26 starts an invader monitoring process.

If a memory action trigger is generated during idle mode, a telephone selecting/call process, a memory action selection process or an invader monitoring process, the personal computer unit 26 performs the memory action (step S16). In this process, the personal computer unit 26 also conducts telephone monitoring. When the memory action is terminated/stopped, the personal computer unit 26 returns to an idle mode. If there is an incoming call and an emergency call must be originated, the personal computer unit 26 performs a telephone selection/call process.

If the battery level drops during the processes in steps S12 through S18 and the micro-controller 25 issues an alarm to the personal computer unit 26, the personal computer unit 26 performs a charge request process (step S19). In this process, the personal computer unit 26 displays a charge request message on the screen of the display device 32 and also outputs a similar voice message from the speaker 34. If the user is at home, charge starts under the control of the micro-controller 25 by him/her receiving this message and inserting the plug of the AC adaptor in the AC main.

When the charge starts, the personal computer unit 26 shifts to idle mode. In this case, the LED 42 flashes and indicates that the battery 23 is being charged. When the charge is completed, the LED 42 goes out. The user recognizes the completion of the charge by the extinguishing of the LED 42, and pulls the plug of the AC adaptor 21 out of the AC main. When the charge is completed, the display device 32 and the speaker 34 can also output a charge completion message.

If the battery level further drops during the charge request process, the personal computer unit 26 turns the software switch 51 off in order to suppress the discharge of the battery 23.

If the robot system must travel in response to the memory action selection process or the remote control process, the personal computer unit 26 instructs the micro-controller 25 to drive the motors 45. Since no travel is required in the telephone selection/call process and the invader monitoring process, the personal computer unit 26 instructs the micro-controller 25 to switch off the power supply of travel control circuits.

As described above, when the micro-controller 25 issues an alarm to the personal computer unit 26, by issuing a charge request to a user, the user can turn the AC adaptor 21 on. Furthermore, by automatically turning the software switch 51 off, the FETs 74 and 76 are turned off, and the leaking current of the drive circuits can be cut off.

According to the present invention, by functionally breaking down the charging/discharging operation of a battery, the maximum charging/discharging performance of the battery can be brought out in a mobile robot system. Accordingly, the power supply control of the robot system can be optimized.

What is claimed is:

1. A power supply control device for a mobile robot system with a travel mechanism and a battery, comprising:
   a charging/discharging circuit electrically controlling charge and discharge of the battery;
   a control circuit checking remaining power in the battery, when the control circuit determines that the remaining power is insufficient, prohibiting an operation of the travel mechanism, issuing an alarm indicating an insufficient remaining power and instructing the charging/discharging circuit to charge the battery, and when the control circuit determines that the remaining power is sufficient, permitting the operation of the travel mechanism; and
   a computer executing a program controlling a series of robot system operations, and on receipt of the alarm from the control circuit, issuing a charge request message to a user.

2. A power supply control device for a mobile robot system with a drive mechanism and a battery, comprising:
   a charging/discharging circuit with a current path that branches current from a power supply adaptor to the battery and to the drive mechanism, supplying current to the drive mechanism from the power supply adaptor while charging the battery with current supplied from the power supply adaptor; and
   a control circuit instructing the charging/discharging circuit to charge the battery, and permitting an operation of the drive mechanism during charge.

3. A power supply control device for a mobile robot system with a battery and a control logic unit, comprising:
   a charging/discharging circuit with a current path that branches current from a power supply adaptor to the battery and to the logic unit, charging the battery with current supplied from the power supply adaptor when the logic unit is not operating, and supplying current to the logic unit from the power supply adaptor while charging the battery with current supplied from the power supply adaptor when the logic unit is operating; and
   a control circuit instructing the charging/discharging circuit to charge the battery.

4. A power supply control device for a mobile robot system with a drive mechanism and a battery, comprising:
   a computer executing a program controlling a series of robot system operations; and
   a switch detecting whether the computer is driven, and when the computer is not driven automatically cutting off power supply to the drive mechanism from the battery.

5. A power supply control method for a mobile robot system with a travel mechanism and a battery, comprising:
   checking remaining power in the battery;
   prohibiting an operation of the travel mechanism and issuing a charge request message to a user when the checking determines that the remaining power is insufficient, and charging the battery when the user turns a power supply adaptor on; and
   permitting the operation of the travel mechanism when the checking determines that the remaining power is sufficient.

6. A power supply control method for a mobile robot system with a drive mechanism and a battery, comprising supplying current to the drive mechanism from a power supply adaptor while charging the battery with current supplied from the power supply adaptor by using a current path that branches current from the power supply adaptor to the battery and to the drive mechanism.

7. A power supply control method for a mobile robot system with a battery and a control logic unit, comprising charging the battery with current supplied from a power supply adaptor by using a current path that branches current from the power supply adaptor to the battery and to the logic unit when the logic unit is not operating, and supplying current to the logic unit from the power supply adaptor while charging the battery with current supplied from the power supply adaptor by using the current path when the logic unit is operating.

8. A power supply control method for a mobile robot system with a drive mechanism and a battery, comprising:
   detecting whether a computer that executes a program controlling a series of robot system operations is driven;
   automatically cutting off power supply to the drive mechanism from the battery when the computer is not driven.

9. A power supply control device for a mobile robot system with a travel mechanism and a battery, comprising:
   a charging/discharging circuit means for electrically controlling charge and discharge of the battery;
   a control means for checking remaining power in the battery, when the control means determines that the remaining power is insufficient, prohibiting an operation of the travel mechanism, issuing an alarm indicating an insufficient remaining power and instructing the charging/discharging circuit means to charge the battery, and when the control means determines that the remaining power is sufficient, permitting the operation of the travel mechanism; and
   a computer means for executing a program controlling a series of robot system operations, and on receipt of the alarm from the control means, issuing a charge request message to a user.

10. A power supply control device for a mobile robot system with a drive mechanism and a battery, comprising:
    a charging/discharging circuit means with a current path that branches current from a power supply adaptor to the battery and to the drive mechanism, for supplying current to the drive mechanism from the power supply adaptor while charging the battery with current supplied from the power supply adaptor; and
    a control means for instructing the charging/discharging circuit to charge the battery, and permitting an operation of the drive mechanism during charge.

11. A power supply control device for a mobile robot system with a battery and a control logic unit, comprising:
    a charging/discharging circuit means with a current path that branches current from a power supply adaptor to the battery and to the logic unit, for charging the battery with current supplied from the power supply adaptor when the logic unit is not operating, and supplying current to the logic unit from the power supply adaptor while charging the battery with current supplied from the power supply adaptor when the logic unit is operating; and
    a control means for instructing the charging/discharging circuit to charge the battery.

12. A power supply control device for a mobile robot a system with a drive mechanism and a battery, comprising:

a computer means for executing a program controlling a series of robot system operations; and a switch means for detecting whether the computer is driven, and when the computer is not driven, automatically cutting off power supply to the drive mechanism from the battery.

13. A method of controlling a power supply for a mobile robot, comprising:

executing a program controlling a series of robot system operations; and detecting whether the program is being executed, and when the program is not being executed, automatically cutting off the power supply to a drive mechanism of the robot from a battery.

* * * * *